US012740903B2

(12) United States Patent
Adams et al.

(10) Patent No.: US 12,740,903 B2
(45) Date of Patent: Sep. 22, 2026

(54) BED FALL PREVENTION DEVICE AND SYSTEM

(71) Applicant: MetaCare Inc., Loganville, GA (US)

(72) Inventors: David Adams, Niceville, FL (US); Brian Cyphert, Santa Rosa Beach, FL (US); Robert Herron, Miramar Beach, FL (US); Jarmaine Go, Chino Hills, CA (US); Bruce Rothmann, Monroe, GA (US); Robert Stanley, Santa Rosa Beach, FL (US)

(73) Assignee: METACARE INC., Loganville, GA (US)

( * ) Notice: Subject to any disclaimer, the term of this patent is extended or adjusted under 35 U.S.C. 154(b) by 267 days.

(21) Appl. No.: 18/376,509

(22) Filed: Oct. 4, 2023

(65) Prior Publication Data

US 2024/0115446 A1 Apr. 11, 2024

Related U.S. Application Data

(60) Provisional application No. 63/413,318, filed on Oct. 5, 2022.

(51) Int. Cl.
*A61G 7/057* (2006.01)
*A61G 7/018* (2006.01)

(52) U.S. Cl.
CPC ......... *A61G 7/05769* (2013.01); *A61G 7/018* (2013.01)

(58) Field of Classification Search
CPC ...... A61G 7/05; A61G 7/0507; A61G 7/0508; A61G 7/0525; A61G 7/018; A61G 7/05769; A61G 7/1021
See application file for complete search history.

(56) References Cited

U.S. PATENT DOCUMENTS

| | | | | |
|---|---|---|---|---|
| 5,794,289 A * | 8/1998 | Wortman | A61G 7/05769 | 5/713 |
| 5,926,883 A * | 7/1999 | Rechin | A61G 7/001 | 362/276 |
| 6,212,714 B1 * | 4/2001 | Allen | A61G 7/0514 | 5/651 |
| 7,441,290 B1 * | 10/2008 | Flick | A61G 7/05776 | 5/713 |
| 8,104,125 B2 * | 1/2012 | Soltani | A61G 7/05769 | 5/713 |

(Continued)

FOREIGN PATENT DOCUMENTS

| | | | |
|---|---|---|---|
| KR | 20210087608 A * | 7/2021 | A61G 7/005 |
| WO | WO-2024186732 A1 * | 9/2024 | A61G 7/018 |

*Primary Examiner* — David E Sosnowski
(74) *Attorney, Agent, or Firm* — Jeffrey D. Mulrooney

(57) ABSTRACT

A remotely deployed, inflatable device designed to reduce or eliminate falls in senior living and assisted care facilities. Upon detecting undesired movement, nurses may deploy one or more inflatable cylinders, thereby inflating the device under one or both sides of the mattress, creating a barrier that prevents the resident from exiting the bed until on-site assistance arrives. It is envisioned that initially the operation of the device will rely on the remote monitoring of residents by one or more operators via live camera feeds. In more advanced versions it is envisioned that software and artificial intelligence will be able to use one or more camera feeds and will be able to supplement or even replace the need for a person to monitor any camera feeds.

8 Claims, 5 Drawing Sheets

(56) References Cited

U.S. PATENT DOCUMENTS

| | | | | |
|---|---|---|---|---|
| 8,347,436 | B2 * | 1/2013 | Flick | A61G 7/05784 5/717 |
| 8,717,181 | B2 * | 5/2014 | Tallent | G08B 25/008 5/940 |
| 12,310,905 | B2 * | 5/2025 | Morimura | A61B 5/1113 |
| 2007/0209118 | A1 * | 9/2007 | Cazzini | A61G 7/0525 5/713 |
| 2009/0106906 | A1 * | 4/2009 | Soltani | A61G 7/05769 5/713 |
| 2011/0047703 | A1 * | 3/2011 | Tarsaud | A61G 7/1021 5/607 |
| 2011/0068932 | A1 * | 3/2011 | Flocard | A61B 5/6891 5/713 |
| 2011/0203053 | A1 * | 8/2011 | Mulliez | A61G 7/05769 5/712 |
| 2011/0302720 | A1 * | 12/2011 | Yakam | A47C 27/082 177/144 |
| 2012/0124744 | A1 * | 5/2012 | Hornbach | A61G 7/16 5/613 |
| 2013/0091631 | A1 * | 4/2013 | Hayes | A61G 7/002 5/600 |
| 2014/0345060 | A1 * | 11/2014 | Ribble | A61B 5/6892 5/706 |
| 2016/0275776 | A1 * | 9/2016 | Shen | A61B 5/024 |
| 2016/0367170 | A1 * | 12/2016 | Larson | A61B 5/02055 |
| 2017/0135880 | A1 * | 5/2017 | Smetka | A61G 7/005 |
| 2019/0156645 | A1 * | 5/2019 | Bolduc | G16H 40/63 |
| 2019/0231083 | A1 * | 8/2019 | Hsu | A61G 7/05776 |
| 2021/0345968 | A1 * | 11/2021 | Autar | A61B 5/6892 |
| 2023/0025313 | A1 * | 1/2023 | Masuda | G16H 40/63 |
| 2023/0071290 | A1 * | 3/2023 | Smith | A61G 7/001 |
| 2024/0277544 | A1 * | 8/2024 | Graves | A61G 7/0524 |
| 2024/0358568 | A1 * | 10/2024 | Lacasse | B29D 22/02 |

* cited by examiner

BED FALL PREVENTION DEVICE AND SYSTEM

CROSS-REFERENCE TO RELATED APPLICATIONS

This application is based on and claims priority to U S. Provisional Patent Application No. 63/413,318 filed Oct. 5, 2022 entitled "BED FALL PREVENTION DEVICE AND SYSTEM"

SUMMARY OF THE INVENTION

An objective of the present invention is to prevent a patient or resident's unassisted exit from a bed that could result in a fall.

The present invention in several embodiments is a remotely deployed, inflatable device designed to reduce or eliminate falls in senior living and assisted care facilities. It is envisioned that initially the operation of the present invention will rely on the remote monitoring of residents by one or more operators via live camera feeds.

Upon detecting undesired movement, nurses may deploy one or more inflatable cylinders, thereby inflating the device under one or both sides of the mattress, creating a barrier that prevents the resident from exiting the bed until on-site assistance arrives.

In more advanced embodiments it is envisioned that software and artificial intelligence will be able to use one or more camera feeds and will be able to supplement or even replace the need for a person to monitor any camera feeds. Detection of undesired movement may be assisted by artificial intelligence, designed to alert the remote operator to the potential of a fall and allowing for timely intervention. For the purpose of this disclosure, the video cameras include image sensors but could also include motion detector technology that does not require visible light, for example infrared sensors, ultrasonic sensors, and microwave motion sensors to enable motion monitoring in the dark. Other inputs could also be used to predict that a patient may be in danger of having an event that may lead to a fall. For example, electroencephalogram (EEG), electrodermal activity (EDA), and/or electrocardiogram (ECG) could be used to measure data related to a patient and the inflatable cylinders could be deployed to prevent a potential fall.

When a remote operator decides an intervention is warranted, the deployment of the inflatable cylinders of the present invention is accomplished by clicking a button on their computer screen. This action enables power to be applied to an air pump via a wired or wireless internet connection, such as an output of the monitoring camera or an internet connected smart plug.

Once the situation has been resolved, the inflatable cylinders of the device of the present invention is deflated manually by on-site staff by pulling on the pressure-relief valve or by a remote operator selecting a button on their screen that opens a remotely controlled relief valve, thus resetting the device for future use.

In several embodiments, the device of the present invention includes an airtight bladder positioned between the mattress foundation and a mattress of a patient or resident's bed (the "Device Bed") used within the context of home healthcare, skilled nursing, independent living, memory care, or hospital care (each an "Institution"). When the bladder is inflated it causes the deformation of the mattress, which acts as a bumper, preventing the patient or resident (the "Subject") from easily exiting the bed. A camera is positioned so it may focus on the Device Bed. A person actively monitors the camera from a remote location. The camera is monitored in real time by an operator using software that utilizes artificial intelligence that will bring certain activity to the attention of the operator. If the operator detects abnormal movement within the Device Bed, the operator will telephone the Institution's nursing station to alert the on-site staff of unwarranted activity that places the Subject at heightened risk for fall and injury. The operator is also able to speak to the subject via remote audio to attempt to calm and reassure the Subject not to try to exit the bed. If deemed necessary to prevent the Subject from falling out of bed, the operator can press a button on the remote monitoring screen to inflate the Device. The Device quickly inflates and provides a passive mechanical barrier intended to prevent the Subject from leaving the bed, thus gaining critical seconds for the on-site nurse to aid the Subject. The Device remains inflated until on-site assistance arrives to assist the Subject. Once the subject is attended to and settled back in bed by the on-site staff, the Device is deflated by the on-site staff by releasing a pressure relief valve or by a remote operator selecting a button on their screen that opens a remotely controlled relieve valve, thus resetting the device for future use. Video monitoring has never ceased, and the Device is ready to be activated again by the operator if deemed necessary.

In one embodiment the present invention is a patient protection device which includes a first airtight bladder in fluid communication with an air pump, a pressure relief valve in fluid communication with the first airtight bladder, an electrical power source electrically connected to the air pump via a remotely controlled switch, the first airtight bladder is secured to a mattress foundation, the first airtight bladder is positioned between the mattress foundation and a mattress, and upon activation of the air pump via the remotely controlled switch the first airtight bladder inflates and causes the deformation of the mattress which acts as a bumper to prevent a person therein from falling off the mattress. In another embodiment the device includes a video camera positioned in view of the mattress, an electronic display in electrical communication with the video camera, and controls in electrical communication with the remotely controlled switch. In another embodiment, the first airtight bladder is formed as an elongated shape. In yet another embodiment the first airtight bladder is cylindrically shaped. In still another embodiment the device includes a second airtight bladder in fluid communication with the air pump. In still yet another embodiment the device includes a second airtight bladder in fluid communication with the air pump, the pressure relief valve is in fluid communication with the second airtight bladder, the second airtight bladder is secured to the mattress foundation, the second airtight bladder is positioned between the mattress foundation and the mattress, and upon activation of the air pump via the remotely controlled switch the second airtight bladder inflates and causes the deformation of the mattress to prevent the person therein from falling off the mattress.

In another preferred embodiment the patient protection system includes a first airtight bladder in fluid communication with an air pump, a pressure relief valve in fluid communication with the first airtight bladder, an electrical power source electrically connected to the air pump via a remotely controlled switch, a processing unit electrically connected to the electrical power source and electrically connected to an electronic display, a sensor in electrical communication with the processing unit, the first airtight bladder is secured to a mattress foundation, the first airtight bladder is positioned between the mattress foundation and a mattress, the sensor monitors an input related to a person on the mattress, upon the processor receiving a predetermined input from the sensor that relates to the person, the processor sends a signal to the electronic display, and upon activation of the air pump via the remotely controlled switch the first airtight bladder inflates and causes the deformation of the mattress to prevent the person therein from falling off the mattress. In another embodiment the sensor is a video camera positioned in view of the mattress. In but another embodiment the first airtight bladder is formed as an elongated shape. In yet another preferred embodiment the first airtight bladder is cylindrically shaped. In still another embodiment the system includes a second airtight bladder in fluid communication with the air pump. In but still another embodiment the system includes second airtight bladder in fluid communication with the air pump, the pressure relief valve is in fluid communication with the second airtight bladder, the second airtight bladder is secured to the mattress foundation, the second airtight bladder is positioned between the mattress foundation and the mattress, and upon activation of the air pump via the remotely controlled switch the second airtight bladder inflates and causes the deformation of the mattress to prevent the person therein from falling off the mattress. In another embodiment the system further includes a second airtight bladder in fluid communication with the air pump, the sensor is a video camera positioned in view of the mattress, the pressure relief valve is in fluid communication with the second airtight bladder, the second airtight bladder is secured to the mattress foundation, the second airtight bladder is positioned between the mattress foundation and the mattress, and upon activation of the air pump via the remotely controlled switch the second airtight bladder inflates and causes the deformation of the mattress to prevent the person therein from falling off the mattress. In another embodiment the system further includes a second airtight bladder in fluid communication with the air pump, the sensor is a video camera positioned in view of the mattress, the first airtight bladder is formed as an elongated shape, the second airtight bladder is formed as an elongated shape, the pressure relief valve is in fluid communication with the second airtight bladder, the second airtight bladder is secured to the mattress foundation, the second airtight bladder is positioned between the mattress foundation and the mattress, and upon activation of the air pump via the remotely controlled switch the second airtight bladder inflates and causes the deformation of the mattress to prevent the person therein from falling off the mattress. In still another embodiment the system further includes a second airtight bladder in fluid communication with the air pump, the sensor is a video camera positioned in view of the mattress, the first airtight bladder is cylindrically shaped, the second airtight bladder is cylindrically shaped, the pressure relief valve is in fluid communication with the second airtight bladder, the second airtight bladder is secured to the mattress foundation, the second airtight bladder is positioned between the mattress foundation and the mattress, and upon activation of the air pump via the remotely controlled switch the second airtight bladder inflates and causes the deformation of the mattress to prevent the person therein from falling off the mattress.

DETAILED DESCRIPTION OF THE INVENTION

Figure 1:
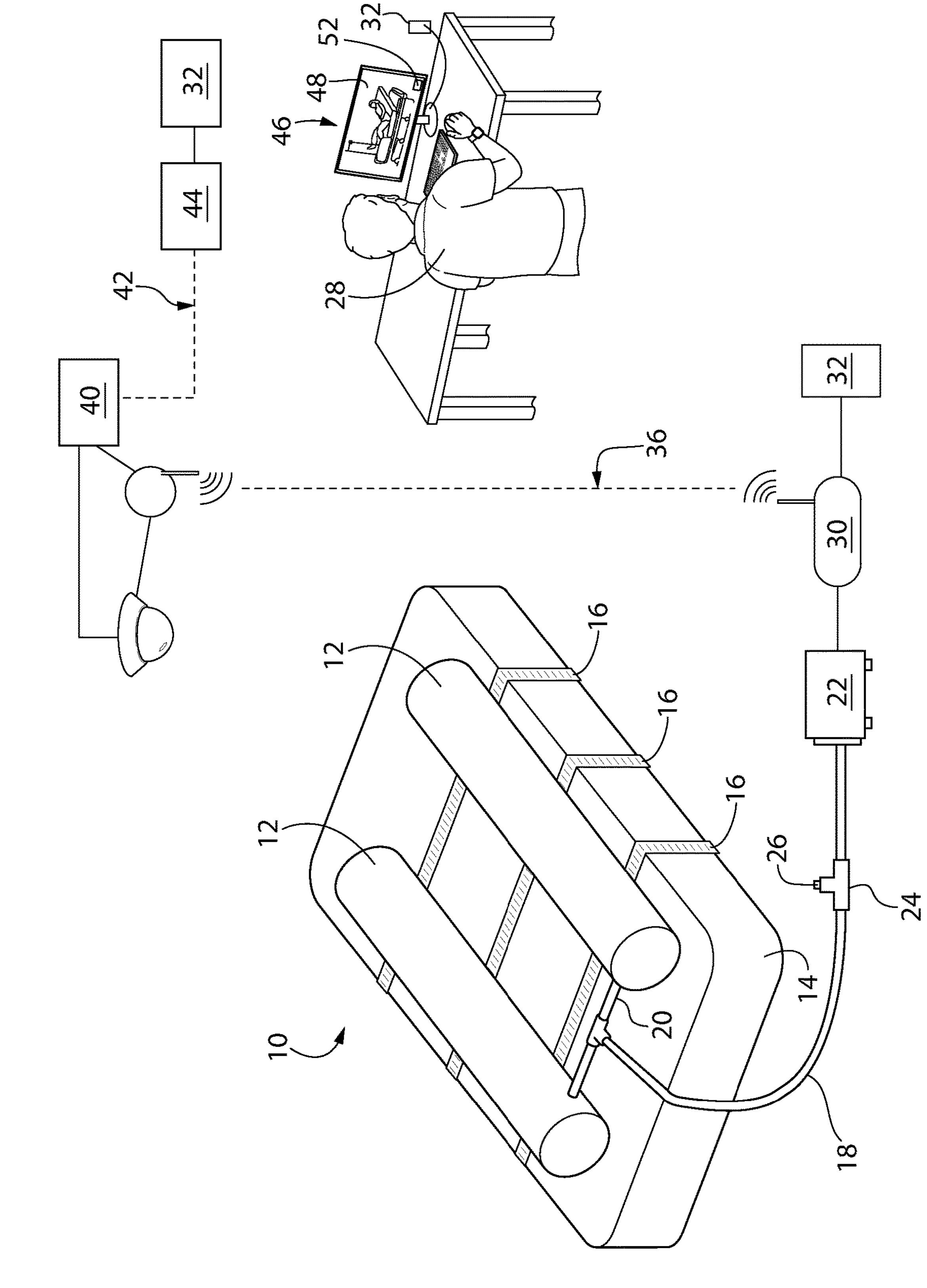
FIG. 1 is an overall schematic view of an embodiment of the of the bed fall prevention system including the bed fall prevention device.
Figure 2:
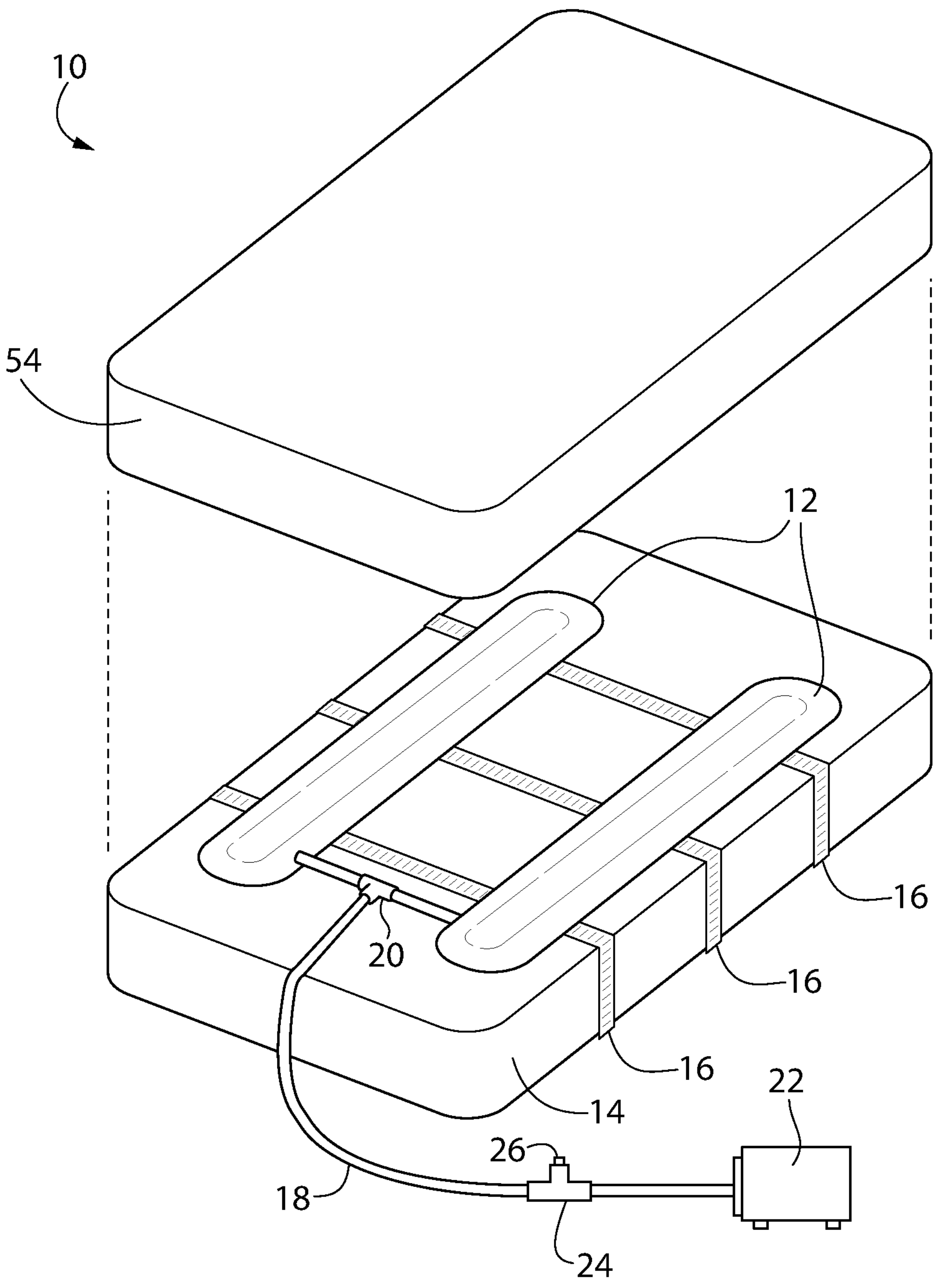
FIG. 2 is an overall isometric view of an embodiment of the bed fall prevention device in a deflated state.
Figure 3:
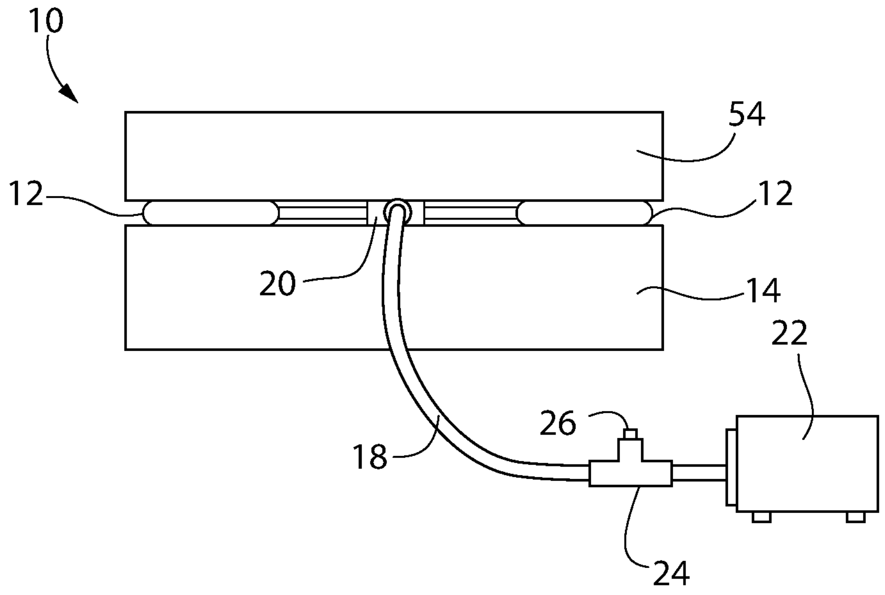
FIG. 3 is an end view of an embodiment of the bed fall prevention device in a deflated state.
Figure 4:
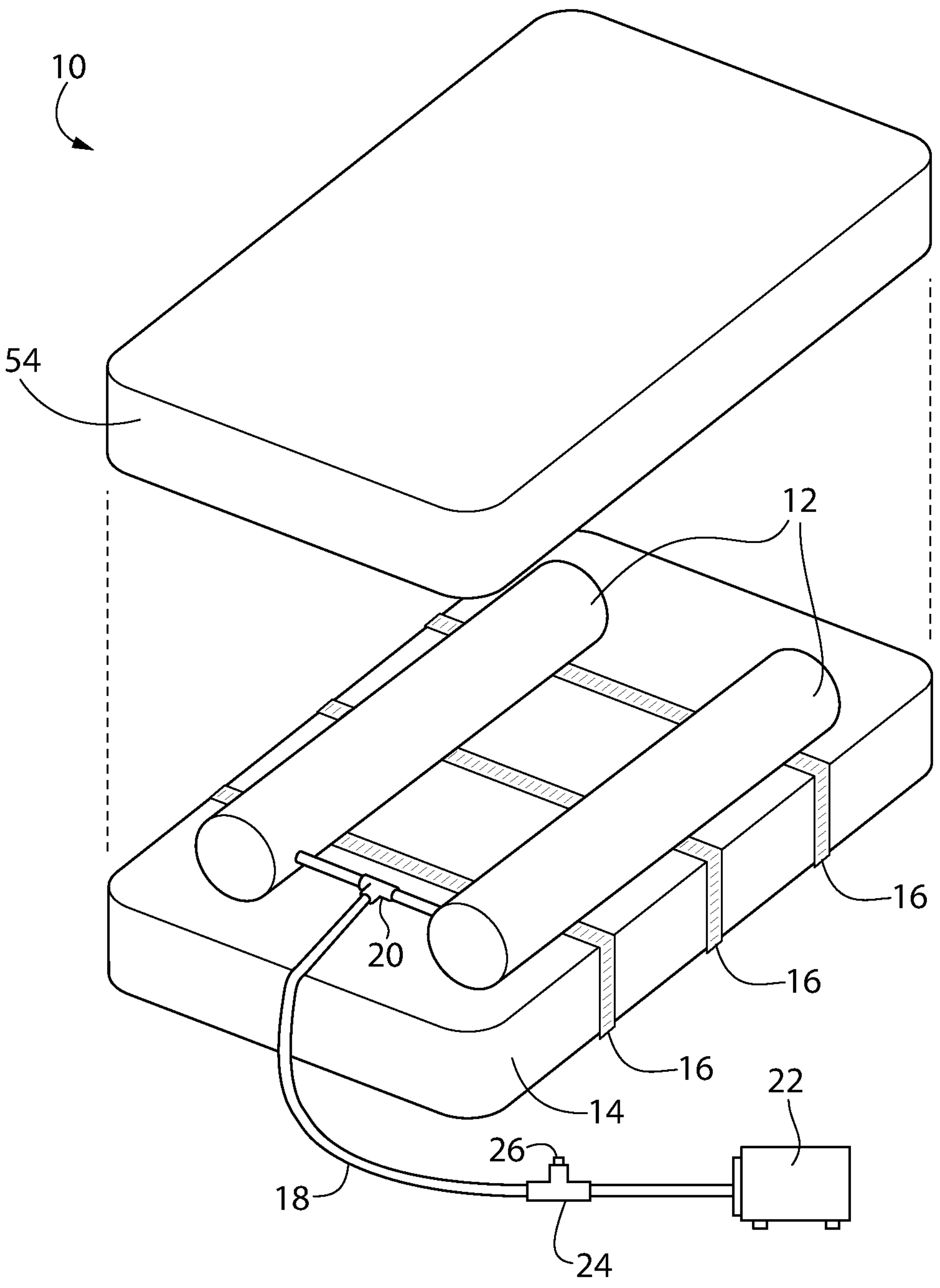
FIG. 4 is an overall isometric view of an embodiment of the bed fall prevention device in an inflated state.

Prior to proceeding with the more detailed description of the present invention it should be noted that, for the sake of clarity, identical components which have identical functions have been designated by identical reference numerals throughout the several views illustrated in the drawings.

Referring in particular to FIGS. 1-5, in a first aspect the present invention provides an apparatus, generally designated 10, including elongated cylindrical airtight bladders 12 secured to mattress foundation 14 via straps 16. The elongated cylindrical airtight bladders 12 are connected to and are in fluid communication with air hose 18 via air manifold 20. Air hose 18 is connected to and in fluid communication with air pump 22. Manually operated pressure release valve 24 is in fluid communication with air pump 22, air hose 18, air manifold 20, and airtight bladders 12. In the present embodiment manually operated pressure release valve 24 is opened via pulling tab 26, however it is envisioned that this could be replaced with a remotely operated and controlled release valve. The present embodiment envisions that it shall be used in conjunction with live human support staff 28. Air pump 22 is connected to and in electrical communication with wireless remote relay switch device 30 that itself is connected and in electrical communication with electrical wall outlet 32 or another suitable power source (not shown). Wireless remote relay switch device 30 is in wireless data communication with remote transceiver 34. The wireless data link 36 between wireless remote relay switch device 30 and remote transceiver 34 could be via known means in the art including WiFi, short range radio frequencies, laser, and infrared. The remote transceiver 34 is in electrical communication with digital video camera 38, and power over ethernet splitter 40 which provides power and a data link 42 to data processor 44. Data processor is provided power via electrical wall outlet 32 or another suitable power source (not shown). The data processor 44 may be a central processing unit, a chipset, general usage server, or personal computer with suitable software installed and configured to enable remote control of the aforementioned devices and viewing on remote computer 46 including display 48. Computer 46 is connected to data processor via data link 50.

Figure 5:
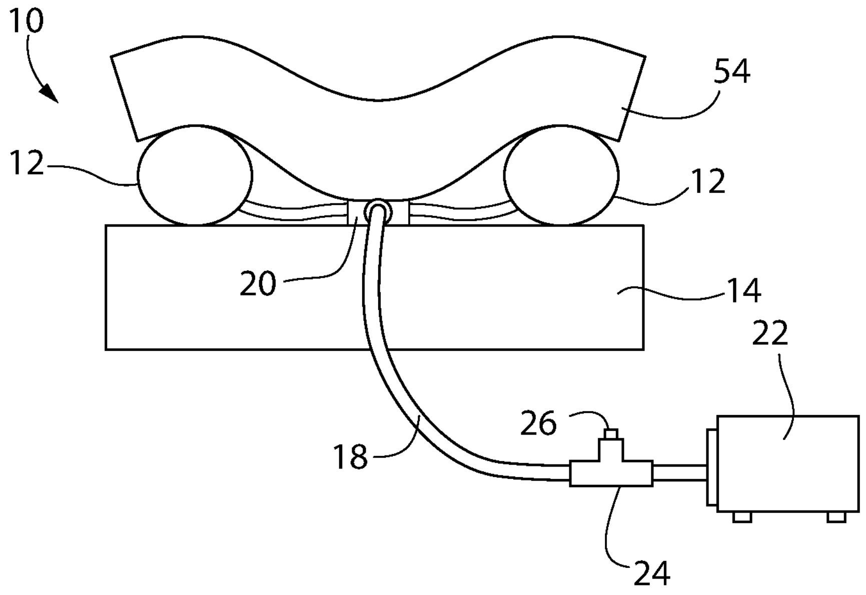
FIG. 5 is an end view of an embodiment of the bed fall prevention device in an inflated state.

When air pump 22 is turned on by live human support staff 28 by activating onscreen button 52, or initiated by data processor 44, due to circumstances captured by digital video camera 38, elongated cylindrical airtight bladders 12 inflate thereby deforming mattress 54 (see FIG. 5). Once the need arises to restore mattress 54 to its original shape, tab 26 is pulled by a person, such as live human support staff 28, thereby opening pressure release valve 24 and allowing the release of air within elongated cylindrical airtight bladders 12 and resetting the apparatus 10.

While a presently preferred embodiment of the present invention has been described in detail above, it should be understood that various other adaptations and/or modifications of the invention can be made by those persons who are particularly skilled in the art without departing from either the spirit of the invention or the scope of the appended claims.

What is claimed is:

1. A patient protection system, the system comprising:

a first airtight bladder in fluid communication with an air pump;

a pressure relief valve in fluid communication with the first airtight bladder;

an electrical power source electrically connected to the air pump via a remotely controlled switch, the remotely controlled switch being configured to be operable by a remote operator at a location remote from a mattress;

a processing unit electrically connected to the electrical power source and electrically connected to an electronic display;

a sensor in electrical communication with the processing unit;

wherein the sensor is a video camera positioned and configured to provide a view of a person on the mattress, the video camera in electrical communication with the electronic display;

wherein the first airtight bladder is secured to a mattress foundation on a first side of the mattress;

wherein the first airtight bladder is positioned between the mattress foundation and the mattress;

the sensor configured to continuously monitor an input related to the person on the mattress;

upon the processor receiving a predetermined input from the sensor that relates to the person, the processor sends a signal to the electronic display, the electronic display configured to present information from the video camera and alert the remote operator of the predetermined input from the sensor; and upon the remote operator activating the remotely controlled switch to activate the air pump electrically connected thereto, the first airtight bladder in fluid communication with the air pump inflates and causes a deformation of the mattress on the first side, the deformation creating a raised barrier along the first side of the mattress, to prevent the person therein from falling off the mattress.

2. The patient protection system of claim 1, wherein the first airtight bladder is formed as an elongated shape.

3. The patient protection system of claim 1, wherein the first airtight bladder is cylindrically shaped.

4. The patient protection system of claim 1, further comprising a second airtight bladder in fluid communication with the air pump.

5. The patient protection system of claim 1, further comprising a second airtight bladder in fluid communication with the air pump;

wherein the pressure relief valve is in fluid communication with the second airtight bladder;

wherein the second airtight bladder is secured to the mattress foundation;

wherein the second airtight bladder is positioned between the mattress foundation and the mattress; and wherein upon activation of the air pump via the remotely controlled switch the second airtight bladder inflates and causes the deformation of the mattress to prevent the person therein from falling off the mattress.

6. The patient protection system of claim 1, further comprising a second airtight bladder in fluid communication with the air pump;

wherein the second airtight bladder is cylindrically shaped;

wherein the pressure relief valve is in fluid communication with the second airtight bladder;

wherein the second airtight bladder is secured to the mattress foundation;

wherein the second airtight bladder is positioned between the mattress foundation and the mattress; and wherein upon activation of the air pump via the remotely controlled switch the second airtight bladder inflates and causes the deformation of the mattress to prevent the person therein from falling off the mattress.

7. The patient protection system of claim 1, further comprising a second airtight bladder in fluid communication with the air pump;

wherein the first airtight bladder is formed as an elongated shape;

wherein the second airtight bladder is formed as an elongated shape;

wherein the pressure relief valve is in fluid communication with the second airtight bladder;

wherein the second airtight bladder is secured to the mattress foundation;

wherein the second airtight bladder is positioned between the mattress foundation and the mattress; and wherein upon activation of the air pump via the remotely controlled switch the second airtight bladder inflates and causes the deformation of the mattress to prevent the person therein from falling off the mattress.

8. The patient protection system of claim 1, further comprising a second airtight bladder in fluid communication with the air pump;

wherein the first airtight bladder is cylindrically shaped;

wherein the second airtight bladder is cylindrically shaped;

wherein the pressure relief valve is in fluid communication with the second airtight bladder;

wherein the second airtight bladder is secured to the mattress foundation;

wherein the second airtight bladder is positioned between the mattress foundation and the mattress; and wherein upon activation of the air pump via the remotely controlled switch the second airtight bladder inflates and causes the deformation of the mattress to prevent the person therein from falling off the mattress.

* * * * *